United States Patent Office 3,057,688
Patented Oct. 9, 1962

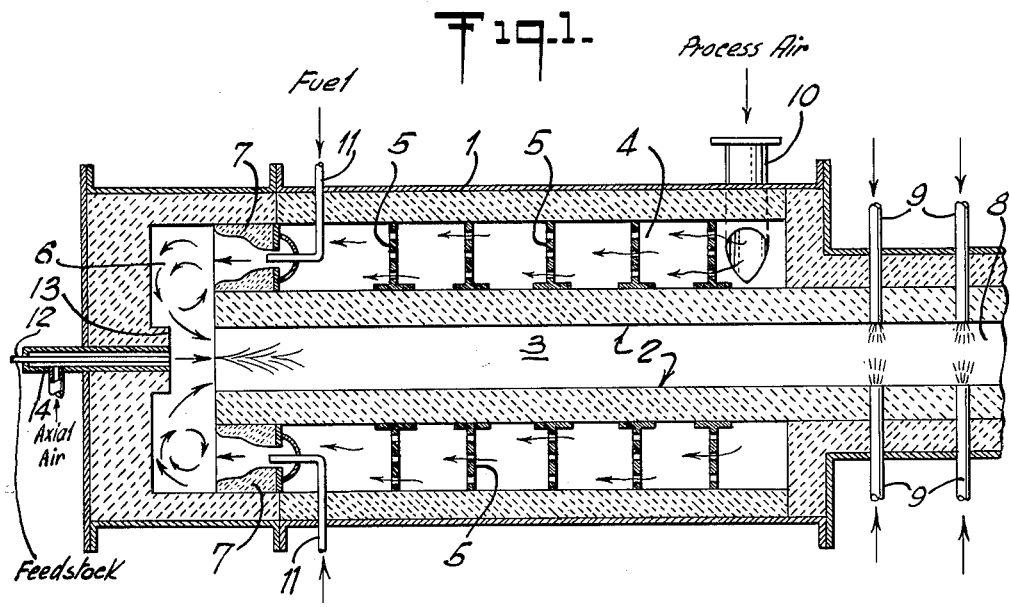
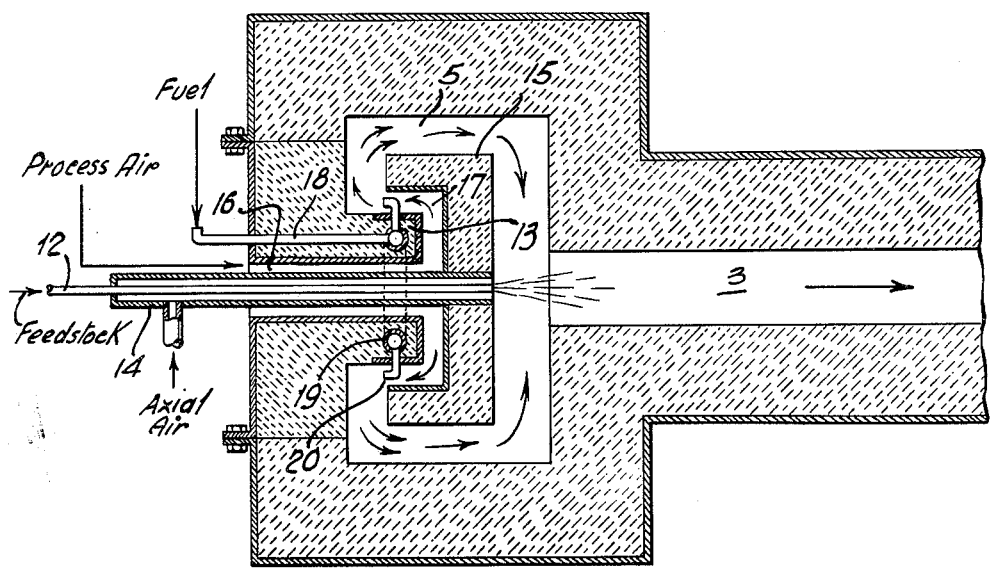

3,057,688
CARBON BLACK PROCESS AND APPARATUS
David Charles Williams, Aransas Pass, Tex., assignor to United Carbon Company, Inc., Houston, Tex., a corporation of Maryland
Filed May 11, 1960, Ser. No. 28,378
5 Claims. (Cl. 23—209.4)

This invention relates to carbon black. More particularly, it relates to the preparation of carbon black. Still more particularly, it relates to a method and apparatus for producing carbon black by thermal decomposition of a hydrocarbon.

The preparation of furnace type carbon blacks by the thermal decomposition of a gaseous or liquid hydrocarbon is well known. In general, this method of preparation comprises decomposing a hydrocarbon by the heat generated from the burning of a portion of the hydrocarbon and/or by decomposing the hydrocarbon by subjecting it to heat generated by the substantially complete combustion of a second, and generally different, hydrocarbon. The hydrocarbon feedstock employed, the method of injecting the reactants into the reactor, reaction temperature, reaction time, peripheral velocity and turbulence of the reaction mass in the reaction chamber, ratio of refractory surface to reaction chamber volume, among others, are all variables which determine the grade of carbon black as well as the quality of any particular grade. There has been and continues to be considerable study of these variables, with the result that over the years various improvements of the furnace process for preparing carbon black have been proposed.

These improvements have taken different forms but, in general, have been related primarily to modifications in the manner of injecting a heat-providing combustible mixture into a combustion zone and/or reaction zone so as to create a high degree of turbulence. In this respect, it has been proposed to inject a combustible hydrocarbon mixture into a combustion zone of a substantially tubular reactor having an elongated reaction zone coaxial and in open end communication with but substantially smaller in diameter than the combustion zone whereby a turbulent spiralling motion is given to the mixture as it enters the reaction zone. Another modification provides for the injection of the combustible mixture into the combustion chamber of a similarly shaped reactor as a plurality of streams directed parallel to the line of flow through the reactor, whereby a turbulence is created in the combustion zone which is continued in the reaction zone as the mixture flows therethrough. In each modification, a hydrocarbon feedstock is introduced into the turbulent mixture in the reaction zone and is rapidly decomposed. It has also been proposed to provide the desired turbulence by injecting the combustible mixture and/or its combustion products directly into a reaction zone in a tangential manner thereto or as a parallel flow to the feedstock flow without in either case first passing through a separate combustion zone as above described.

Although these modifications and others have proved successful to varying degrees in the preparation of furnace blacks, they are all subject to any one or more of various disadvantages. For this reason, there has remained continued effort directed towards producing still further refinements in the furnace process. It is a principal object of this invention to provide a process and apparatus for preparing furnace type carbon blacks that constitute such a refinement. It is a further object of this invention to provide an improved process for preparing various reinforcing rubber grade carbon blacks. It is a still further object of this invention to provide a process for preparing such carbon blacks with greater thermal efficiency. Additional objects will be apparent from the following description of the process and apparatus.

In general, the process of this invention comprises introducing a hydrocarbon feedstock into one end of an elongated, tubular reaction zone maintained at a carbon black forming temperature. Similar to previous processes, a material capable of creating and maintaining this temperature is introduced into a tubular combustion zone coaxial and in open end communication with the reaction zone. According to the process of this invention, however, the material is caused to follow a path within the combustion zone which involves at least one substantially 180 degree change of direction prior to entry of the material with the same end of the reaction zone as the feedstock. An intimate mixture of the material and the feedstock is thus obtained at the entrance end of the reaction zone whereby the feedstock is brought to its cracking temperature. The reaction is terminated at a predetermined time, and the resultant carbon black-bearing gases subjected to further treatment to separate and collect carbon black.

Although the process of this invention may be conducted in any reactor of a configuration suitable to carry out the steps thereof, nevertheless, it can be more easily described and its advantages best appreciated by reference to a specific configuration. For this purpose, therefore, the process of this invention will be further discussed in conjunction with the accompanying drawing in which:

FIGURE 1 is a sectional plan view of a reactor in accordance with this invention; and FIGURE 2 is a sectional plan view of another reactor in accordance with this invention.

In describing the process and apparatus of this invention, the terms "combusitble mixture" and "combustion mass" will be employed. By the former is meant a mixture of a hydrocarbon and a combustion supporting oxygen-bearing gas. By the latter is meant a mass comprising the products resulting from the combustion of the combustible mixture which mass may or may not include unreacted combustible mixture or a combustion-supporting oxygen-bearing gas substantially free of unreacted hydrocarbon.

Referring now to FIGURE 1 of the drawing, reference numeral 1 denotes a generally tubular reactor. Extending from the exit end of reactor 1 towards the opposite end is a hollow open end reaction tube 2 of smaller diameter than the reactor providing reaction zone 3 and heat exchange zone 4. As shown, tube 2 is supported along its length by a plurality of perforated or segmented heat resistance support rings 5 positioned in zone 4. Reaction tube 2 terminates short of the opposite or entrance end of reactor 1 to provide a combustion zone 6 of greater diameter and shorter length than reaction zone 3. Combustion zone 6 communicates with heat exchange zone 4 through burner port or ports in multiple burner block 7. Reaction tube 2 extends through the exit end wall of reactor 1 to provide a quench zone 8 equipped with suitable quench ports 9. As illustrated, reactor 1 and burner block 7 are composed of high temperature insulating refractory material while reaction tube 2 is composed of a refractory material having a high thermal conductivity. The entire reactor is enclosed in a steel shell or casing.

Near the exit end of the reactor are inlet means 10 for introducing a combustion-supporting oxygen-bearing gas, herein referred to as "process air," into heat exchanger zone 4. Inlets 10 may obviously vary in number as well as position, although they are preferably disposed so as to introduce the process air tangentially to the surface of heat exchanger zone 4. Located adjacent burner block 7 is hydrocarbon fuel injector means 11. Injector means 11 may comprise a plurality of separate burner units of a conventional inspirator type having air ducts communicating with heat exchange zone 4 and hydrocarbon fuel jets communicating with a common circular fuel manifold. Alternatively, injector means 11 may comprise merely a circular burner provided with a plurality of orifices. Whatever the means, the combustible mixture comprising the hydrocarbon fuel and process air is directed into the combustion zone in a path substantially parallel to the axis of the reactor and in a direction substantially 180 degrees opposed to or out of phase with the normal process flow therethrough. While the passage of process air through heat exchange zone 4 is a preferred embodiment, it is apparent that zone 4 may be substantially eliminated and process air introduced in the vicinity of burner block 7.

Extending through the entrance end of reactor 3 and surrounded by refractory shoulder 13 is a hydrocarbon feedstock injector tube 12 carrying at its inner end a feedstock nozzle, not shown, which may be variously positioned within the combustion zone. The feedstock nozzle may take any form capable of directing feedstock towards the entrance of reaction zone 3 in a vaporized or atomized form. Surrounding injector tube 12 is a larger tube 14 provided with means for introducing a coolant to cool injector tube 12 and its nozzle. This coolant may be a combustion-supporting oxygen-bearing gas herein referred to as axial air, or any preheated inert gas such as nitrogen or the like.

In conducting the process of this invention, a hydrocarbon fuel is introduced through fuel injector means 11 and process air through inlets 10. The flow of process air, preferably caused to follow a spiralling configuration through heat exchange zone 4, is impeded by baffle plates 5 and its temperature raised by heat exchange between the reaction zone and the heat exchange zone. Upon reaching burner block 7, the process air is formed with the hydrocarbon fuel into a combustible mixture which is injected into combustion zone 6 and ignited. The mixture and the resultant combustion mass are directed towards the entrance end wall of the reactor, and caused to change direction of flow by substantially 180 degrees prior to entering reaction zone 3. The result is a mass having exceptional turbulence created as the reversing flow violently encounters the initial oppositely directed flow, the turbulence being carried into the reaction zone as the mass is drawn thereinto. As hydrocarbon fuel and process air are introduced into the reactor, through their respective inlets, hydrocarbon feedstock as a vapor or finely divided liquid spray is introduced through tube 12 and injected into the reaction zone as an expanding cone. The feedstock is rapidly heated and cracked as it enters the reaction zone and is thoroughly mixed with and dispersed in the hot combustion mass. The reaction is terminated as desired by quenching with water or other suitable cooling medium introduced through quench ports 9. The cooled reaction gas with entrained carbon black then exits from the reactor and is subjected to separation and collection of carbon black by means which form no part of this invention.

FIGURE 2 illustrates another reactor according to this invention in which reference numerals corresponding to those in FIGURE 1 indicate corresponding parts. As shown in FIGURE 2, the reactor is provided with an injector assembly comprising a deflector 15 of refractory material, the position of the assembly being adjustable with respect to shoulder 13 and the entrance of reaction zone 3 by means not shown. Extending through deflector 15 are hydrocarbon fuel injector tube 12 and axial air tube 14. Circumferential to feedstock and axial air tubes 12 and 14 is process air injector conduit 16 in communication with combustion zone 5 through passageway 17 formed by shoulder 13 and deflector 15. Reference numeral 18 is a hydrocarbon fuel conduit terminating in distribution ring 19 provided with a plurality of radially spaced fuel nozzles 20, positioned to introduce fuel into combustion chamber 5 in a direction 180 degrees opposed to the normal flow through the reactor.

The practice of the process when conducted in the reactor of FIGURE 2 is believed apparent. Process air and hydrocarbon fuel are introduced through conduits 16 and 18, respectively, and are subjected to a violent mixing action as the process air follows the tortuous path of passageway 17 and enters chamber 5 while the fuel is injected thereinto through nozzles 20. The combustible mixture thus formed and the resultant combustion mass formed on ignition are directed towards the entrance end wall of the reactor and caused to change direction of flow by substantially 180 degrees. The result is a mass having exceptional turbulence created as the reversing flow encounters the initially oppositely directed flow, the turbulence being carried into the reaction zone as the flow follows a path thereto through the combustion zone as indicated.

In the description of the process to this point, the hydrocarbon feedstock has not been specified since the process is not restricted thereby nor is there any desire to so restrict it. Generally, any gaseous or liquid hydrocarbon may be employed in the process. As used throughout the specification and claims, therefore, the term hydrocarbon feedstock is intended to mean, generally, any hydrocarbon. Thus, natural gas as well as heavier hydrocarbon oils from both petroleum and non-petroleum sources may be employed in the process of this invention. Such oils may contain aliphatic hydrocarbon compounds whether acyclic or cyclic, saturated or unsaturated or any aromatic hydrocarbon compound. The hydrocarbon fuel likewise may be varied and may be the same as or different from the hydrocarbon feedstock. Generally, however, the hydrocarbon fuel will be natural gas, if readily available, or fuel oil. The combustion-supporting oxygen-bearing gas employed as process air and/or axial air may be air, oxygen-enriched air, oxygen the like, but, for practical reasons, will usually be air. The amount of combustion supporting oxygen-bearing gas employed will vary depending upon the hydrocarbon fuel as well as the grade of carbon black being produced. The amount of oxygen employed in any particular case may be readily determined by one skilled in the art. Usually, the amount of oxygen employed will range from about that stoichiometrically required to obtain substantially complete combustion of the hydrocarbon fuel to as much as 125–150% of the stoichiometric amount. The predetermined amount of oxygen-bearing gas to be employed will, for the most part, usually be introduced to the reactor as process air with usually not more than about 8% being introduced with the hydrocarbon feedstock as axial air.

The following examples further describe the invention. These examples are illustrative only and not by way of limitation. The examples are conducted in an apparatus as illustrated in FIGURE 1 in which the reaction zone has a diameter of 12 inches and a length of 12 feet; the combustion zone has a diameter of 42 inches and a length of 15 inches; and the annular heat exchange zone has a radius of 18 inches and a length of 10 feet.

*Example 1*

The hydrocarbon feedstock employed is a residual oil having the following analysis:

| | |
|---|---|
| Gravity, API | 6.5 |
| Viscosity, SUS, @ 210° F | 43.4 |
| Ash, percent | 0.01 |
| Conradson carbon, percent (10% res.) | 6.47 |
| Sulfur, percent | 0.99 |
| Flash point, ° F | 290 |
| Pour point, ° F | 40 |
| BMCI | 95.2 |
| Aniline point | 129 |

Distillation, ° F.:

| | |
|---|---|
| IBP | 445 |
| 10 | 620 |
| 20 | 720 |
| 30 | 760 |
| 40 | 805 |
| 50 | 860 |

The hydrocarbon fuel is natural gas with a heating value of 1095 B.t.u./cu. ft. The oxygen-bearing gas is air. The gas rate is 8,000 cu. ft./hr., air rate 120,000 cu. ft./hr. and feedstock rate 180 gallons/hr. Reaction temperature is 2400–2700° F. Yield of HAF black is 4.4 lbs./gal.

*Example 2*

The process of Example 1 is repeated using a gas rate of 10,000 cu. ft. /hr. and an air rate of 150,000 cu. ft./hr. and a feedstock rate of 160 gallons/hr. Yield of ISAF black is 3.6 lbs./gal.

I claim:

1. A process for preparing carbon black by thermal decomposition of a hydrocarbon which comprises: introducing a hydrocarbon feedstock through one end of a tubular combustion zone so as to create a feedstock flow therein along the axis thereof toward a reaction zone at the opposite end thereof; introducing a hydrocarbon fuel and a combustion-supporting oxygen-bearing gas into said one end of said combustion zone adjacent said feedstock flow so that a mixture thereof flows countercurrent to and out of contact with said feedstock flow towards said one end of said combustion zone as an annular stream; subjecting the hydrocarbon fuel of said stream to combustion; changing the direction of said countercurrent flowing annular stream so that it flows radially away from said feedstock flow, then substantially parallel to and in the same direction as said feedstock flow and then inwardly toward said axis and said feedstock flow as it approaches said opposite end of said combustion zone, whereby said feedstock is heated without intimately contacting said stream and the combustion of said fuel is substantially completed by the time said steam approaches said feedstock; intimately mixing said feedstock in the resultant stream of combustion products and passing the resultant mixture into said reaction zone whereby said feedstock is thermally decomposed to carbon black, and recovering carbon black.

2. A reactor for producing carbon black which comprises: a tubular combustion chamber of greater diameter than length provided with a circumferential wall and end walls, said chamber communicating through one of its end walls with a tubular reaction chamber of smaller diameter and greater length than said combustion chamber; a hydrocarbon feedstock means for introducing feedstock into said combustion chamber through the other end wall thereof and for directing its flow along the axis thereof towards said reaction chamber; a tubular shoulder carried by the other end wall and extending into said combustion chamber; a deflector mounted in said combustion chamber and positioned with respect to said tubular shoulder so as to form therewith a circumferential orifice opening in a direction towards said other end wall, means for introducing a hydrocarbon fuel and a combustion-supporting oxygen-bearing gas through said orifice and into said combustion chamber so that a mixture thereof flows countercurrent to and out of contact with said feedstock toward said other end wall as an annular stream; and means comprising said end walls and said circumferential wall for directing said stream and the products resulting from the combustion of the hydrocarbon fuel radially in all directions toward said circumferential wall, then substantially parallel to said axis toward said one end wall and then inwardly toward said axis whereby said stream and said feedstock are intimately mixed as they enter said reaction chamber, the path of said stream as determined by the various said means being such as to permit substantially complete combustion of the hydrocarbon fuel before mixing of the stream and feedstock occurs.

3. A reactor for producing carbon black which comprises: a tubular combustion chamber of greater diameter than length provided with a circumferential wall and end walls, said chamber communicating through one of its end walls with a tubular reaction chamber of smaller diameter and greater length than said combustion chamber; a tubular shoulder carried by the other end wall and extending into said combustion chamber; a tubular member extending through said other end wall of said combustion chamber; an annular deflector carried by said tubular member and forming with said tubular shoulder a circumferential orifice opening in a direction towards said other end wall; means within said tubular member for injecting a hydrocarbon feedstock into said combustion chamber along the axis thereof toward said reaction chamber; means for introducing a hydrocarbon fuel and a combustion-supporting oxygen-bearing gas through said orifice and into said combustion chamber through said other end wall so that a mixture thereof flows countercurrent to and out of contact with said feedstock toward said other end wall as an annular stream of diameter less than that of said annular deflector; and means comprising said end walls and said circumferential wall for directing said stream and the products resulting from the combustion of said hydrocarbon fuel radially in all directions toward said circumferential wall, then substantially parallel to said axis toward said one end wall and then inwardly toward said axis whereby said stream and said feedstock are intimately mixed as they enter said reaction chamber, the path of said stream as determined by the various said means being such as to permit substantially complete combustion of the hydrocarbon fuel before mixing of the stream and feedstock occurs.

4. A reactor for producing carbon black which comprises: a tubular combustion chamber of greater diameter than length provided with a circumferential wall and end walls, said chamber communicating through one of its end walls with a tubular reaction chamber of smaller diameter and greater length than said combustion chamber; a tubular shoulder carried by the other end wall and extending into said combustion chamber; a first tubular member extending through said other end wall and said tubular shoulder; an annular deflector carried by said first tubular member; said deflector comprising a face portion parallel to the end of said tubular shoulder and a circumferential projection extending at a right angle to said face portion and circumferentially surrounding said tubular shoulder; said face being positioned from the end of said tubular shoulder to provide a radially extending passageway communicating with an axially extending passageway formed by said circumferential projection and the circumferential surface of said tubular member, said axially extending passageway communicating with the combustion chamber through a circumferential orifice opening in a direction toward said other end wall; means within said tubular member for injecting a hydrocarbon feedstock into said combustion chamber along the axis thereof toward said reaction chamber; means for introducing a hydrocarbon fuel and a combustion-supporting oxygen-bearing gas into said orifice whereby a mixture thereof is caused to enter said combustion chamber flowing toward said other end wall as an annular stream; and means comprising said end walls and said circumferential wall for directing said stream and the products resulting from the combustion of the hydrocarbon fuel radially in all directions toward said circumferential wall, then substantially parallel to said axis toward said one end wall and then inwardly toward said axis whereby said stream and said feedstock are intimately mixed as they enter said reaction chamber, the path of said stream as determined by the various said means being such as to permit substantially complete combustion of the hydrocarbon fuel before mixing of the stream and feedstock occurs.

5. A reactor according to claim 4 provided with a second tubular member concentric to and of greater diameter than said first tubular member communicating with said radially extending passageway for introducing a combustion-supporting oxygen-bearing gas into said passageway.

References Cited in the file of this patent

UNITED STATES PATENTS

| | | |
|---|---|---|
| 2,343,866 | Hincke | Mar. 14, 1944 |
| 2,656,254 | Heller | Oct. 20, 1953 |
| 2,915,371 | Sweitzer | Dec. 1, 1959 |
| 2,924,512 | Webster | Feb. 9, 1960 |
| 2,976,127 | Latham | Mar. 21, 1961 |
| 2,976,128 | Latham et al. | Mar. 21, 1961 |

FOREIGN PATENTS

| | | |
|---|---|---|
| 786,730 | Great Britain | Nov. 27, 1957 |